United States Patent
Koo

(10) Patent No.: US 7,039,783 B2
(45) Date of Patent: May 2, 2006

(54) DUAL APPARATUS AND METHOD THEREOF USING CONCURRENT WRITE FUNCTION

(75) Inventor: Gang-Mo Koo, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 10/270,050

(22) Filed: Oct. 15, 2002

(65) Prior Publication Data

US 2003/0074534 A1 Apr. 17, 2003

(30) Foreign Application Priority Data

Oct. 16, 2001 (KR) .............................. 2001-63755

(51) Int. Cl.
*G06F 13/00* (2006.01)
*G06F 11/20* (2006.01)

(52) U.S. Cl. ...................... 711/168; 711/162; 709/248; 714/6

(58) Field of Classification Search .................. 710/52, 710/305–306, 310, 313–315, 61, 62, 72; 711/154, 168, 146; 714/400, 600; 709/224, 709/248, 250, 400

See application file for complete search history.

(56) References Cited

U.S. PATENT DOCUMENTS

| | | | | | |
|---|---|---|---|---|---|
| 5,682,518 | A | * | 10/1997 | Inoue | 711/162 |
| 5,974,491 | A | * | 10/1999 | Jung et al. | 710/106 |
| 6,073,190 | A | * | 6/2000 | Rooney | 710/56 |
| 6,327,670 | B1 | * | 12/2001 | Hellenthal et al. | 714/5 |
| 6,477,607 | B1 | * | 11/2002 | Jeong | 710/305 |

* cited by examiner

*Primary Examiner*—Denise Tran
(74) *Attorney, Agent, or Firm*—Fleshner & Kim, LLP

(57) ABSTRACT

In a dual apparatus and a method thereof using a concurrent write function, a PCI bridge of an active board snoops a processor bus. When a processor carries data and a control signal to the processor bus in order to change content of a memory of the active board, the PCI bridge checks whether data synchronization is required. When the data synchronization is required, the PCI bridge buffers the data and the control signal from the processor bus, and transmits them to a standby board through a PCI bus. Accordingly, the content of the memory of the standby board is changed. While the PCI bridge performs the content change of the memory of the standby board, the processor of the active board changes content of the memory of the active board. Accordingly, a performance of the processor can be improved, and accordingly data synchronization can be performed quickly.

7 Claims, 6 Drawing Sheets

DUAL APPARATUS AND METHOD THEREOF USING CONCURRENT WRITE FUNCTION

BACKGROUND OF THE INVENTION

1. Field of the Invention

The present invention relates to a communication system, and in particular to a dual apparatus and a method thereof having a PCI bridge having a concurrent write function.

2. Background of the Related Art

In a communication system, an apparatus which may fatally damage the system if it fails is implemented as dual. In general, there are two dual implementations. These are a warm standby dual method and a hot standby dual method.

In the warm standby dual method, an active board is operated and a standby board is not operated. Accordingly, an operation for synchronizing a memory of the active board with a memory of the standby board is required.

In the hot standby dual method, one board is operated as a primary board, and the other board is operated as a secondary board. An output of the primary board is used as an effective output, and an operation for synchronizing memories of the two boards with each other is not required.

Herein, the warm standby dual method will be described.

FIG. 1 is a drawing illustrating a construction of an exemplary dual apparatus using a peripheral component interconnect (PCI) bridge.

As depicted in FIG. 1, the dual apparatus using the PCI bridge includes a first board 10 and a second board 20. The first board 10 and the second board 20 are connected with each other by the PCI bus 30.

The first board 10 includes a first processor 11 for outputting data and a control signal and a first main memory 12 for storing the data according to the control signal. The first board 10 also includes a first PCI bridge 14 for exchanging information with the second board 20 through the PCI bus 30 according to the control of the first processor 11. Additionally, a bus is provided to couple the PCI bridge 14 to the first processor 11 and the first main memory 12.

The second board 20 has the same construction as that of the first board 10. Specifically, the second board 20 includes a second processor 21 for outputting data and a control signal and a second main memory 22 for storing the data according to the control signal. The second board 20 also includes a second PCI bridge 24 for exchanging information with the second board 20 through the PCI bus 30 according to the control of the second processor 21. Additionally, a bus is provided to couple the PCI bridge 24 to the second processor 21 and the second main memory 22.

Because the dual apparatus using the PCI bridge is implemented by the warm standby dual method, the first main memory 12 of the first board 10 and the second main memory 22 of the second board 20 have to be synchronized with each other.

A method for synchronizing memory data of the dual apparatus using the PCI bridge will next be described. It is assumed that the first board 10 is operated as active and the second board 20 is operated as standby.

When there is a need to change data, synchronization of data in the first main memory 12 (with the exception of content in an operating system code region and a stack region) is required. Thus, the first processor 11 of the first board 10 gains access to the first main memory 12 and changes content therein. Afterward, it performs a procedure for changing content in the second main memory 22.

As described above, the first processor 11 sequentially performs the memory content change operation of the first board 10 and the memory content change operation of the second board 20. Accordingly, the first main memory 12 and the second main memory 22 are synchronized with each other.

The operation for changing the memory content will be descried in more detail.

FIG. 2 illustrates a path when the first processor 11 of the first board 10 in the active state changes content of the first main memory 12. For example, when there is data to be written in the first main memory 12, the first processor 11 carries the data and an address (processor bus address) of the first main memory 12 corresponding to the data to the first processor bus 13. Then, the first main memory 12 receives the data and the address through the first processor bus 13 and writes the data in the corresponding address.

When the first processor 11 finishes changing the memory content of the first memory 12, the first processor 11 changes content of the second main memory 22.

FIG. 3 illustrates a path when the first processor 11 of the first board 10 in the active state changes content of the second main memory 22.

The active first processor 11 carries the same data and PCI address as the data that was written in the first main memory 12 to the first processor bus 13. The PCI address corresponds to the processor bus address (address of the first main memory 12). The first PCI bridge 14 then receives the PCI address and the data of the first processor bus 13 and transmits the PCI address and the data to the second PCI bridge 24 of the second board 20 through the PCI bus 30.

The second PCI bridge 24 converts the received PCI address into a processor bus address and carries the converted processor bus address and the data to the second processor bus 23.

The second main memory 22 receives the processor bus address and the data through the second processor bus 23 and writes the data in the corresponding processor bus address of the second main memory 20.

The related art dual apparatus using the PCI bridge has various problems. For example, because the active board processor sequentially writes the same data in the first memory and then in the second memory, resources of the processor of the active board are required for data synchronization between the two memories. Accordingly, data synchronization may consume much time and waste resources of the first processor. In addition, the performance of the first processor may be lowered.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a dual apparatus using a concurrent write function capable of quickly performing data synchronization between two memories.

It is another object of the present invention to provide a dual apparatus that performs synchronization by connecting a PCI bridge having a concurrent write function between a memory of an active board and a memory of a standby board.

It is another object of the present invention to provide a dual synchronization method using a concurrent write function capable of improving a processor's performance by preventing an active processor from participating in data synchronization between a first memory and a second memory by performing a concurrent write function of the second memory by snooping a processor bus.

It is another object of the present invention to provide a dual synchronization method using a concurrent write function that prevents data loss when a transmission buffer for buffering data to be concurrent-written is full due to transmission speed difference (because a processor bus's transmission speed is faster than a PCI bus's transmission speed).

It is another object of the present invention to provide a dual synchronization method using a concurrent write function capable of preventing data loss due to transmission speed difference.

It is another object of the present invention to provide a dual synchronization method using a concurrent write function that prevents an active board's processor from occupying a processor bus by making an active board's first concurrent write PCI bridge occupy the processor bus until a transmission buffer has a certain buffering space.

In order to further achieve the above-mentioned objects, in whole or in parts, there is provided a dual apparatus using a concurrent write function having an active board for performing concurrent write in a memory thereof and the other party's memory according to a bus snooping result and a standby board for performing data synchronization with the memory of the active board according to the concurrent write procedure of the active board.

In order to further achieve the above-mentioned objects in whole or in parts, there is provided a dual method using a concurrent write function including outputting data and a control signal from an active processor to a processor bus; snooping the processor bus; buffering the data and the control signal from the processor bus when data synchronization is required; transmitting the buffered data and the control signal to a standby board; and writing the data and the control signal in a memory of the standby board.

In order to further achieve the above-mentioned objects in whole or in parts, there is provided a dual method using a concurrent write function including monitoring an operation of a processor gaining access to a memory thereof: and performing concurrent write in the memory thereof and the other party's memory in the operation required data synchronization.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
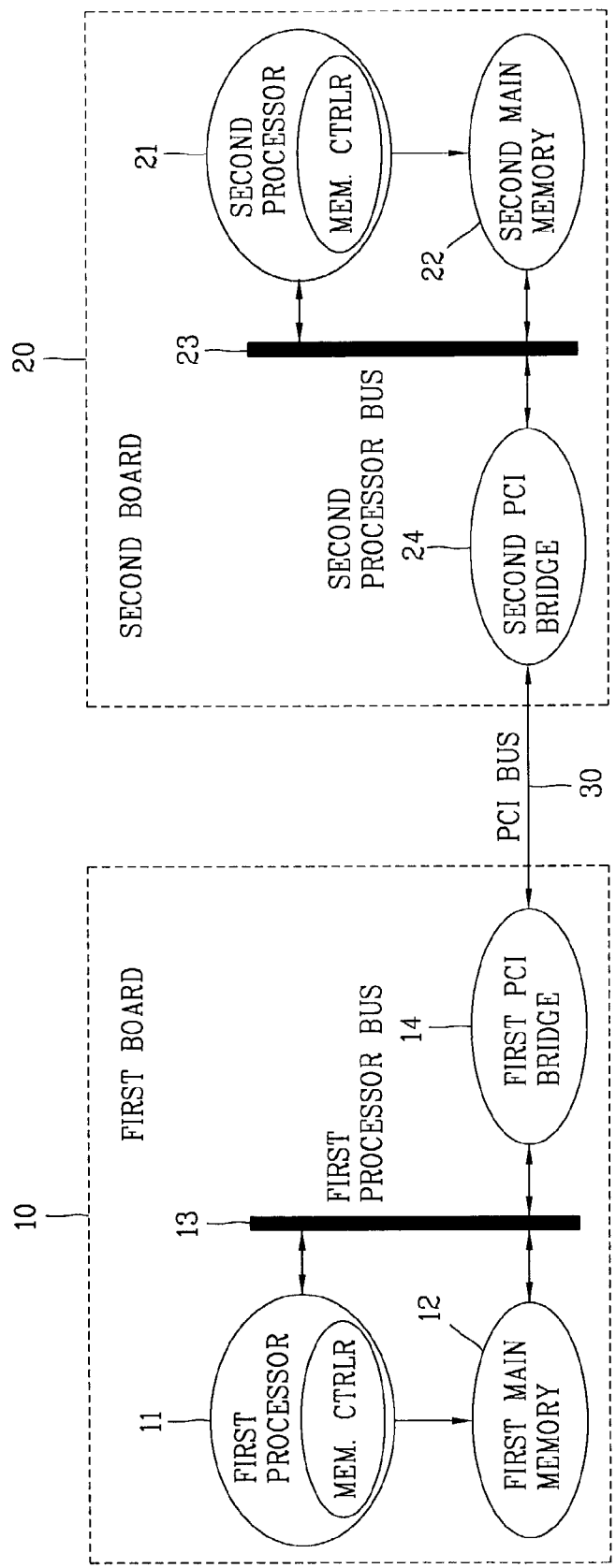
FIG. 1 is a drawing illustrating a construction of an exemplary dual apparatus using a PCI (peripheral component interconnect) bridge.
Figure 2:
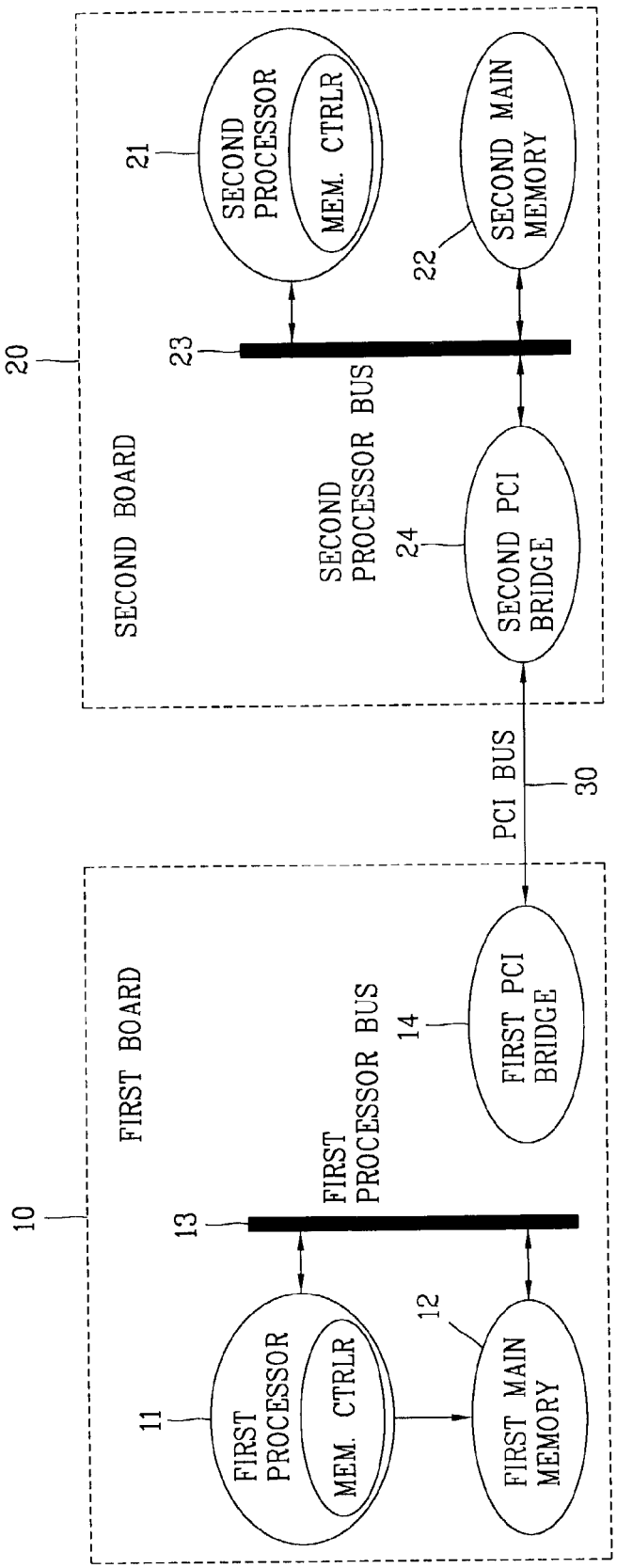
FIG. 2 illustrates an effective path when an active board's processor changes content of a memory thereof.
Figure 3:
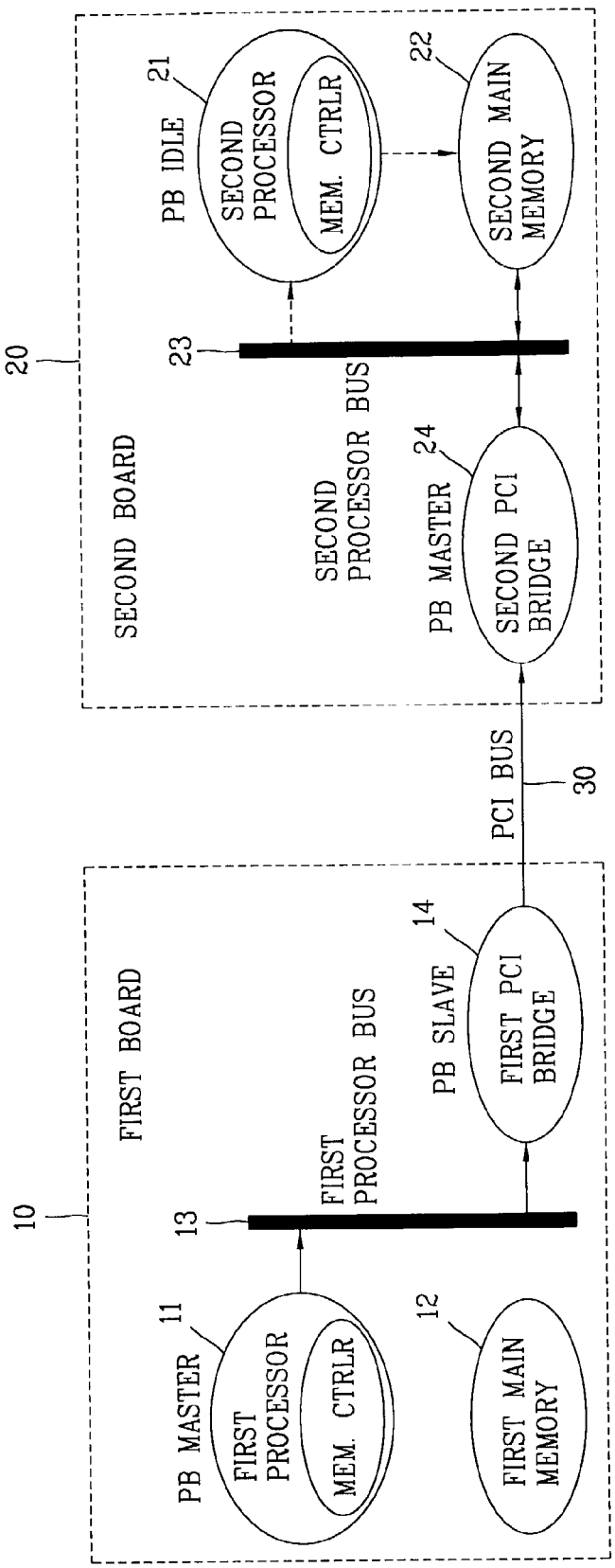
FIG. 3 illustrates an effective path when the active board's processor changes content of a standby board's memory.
Figure 4:
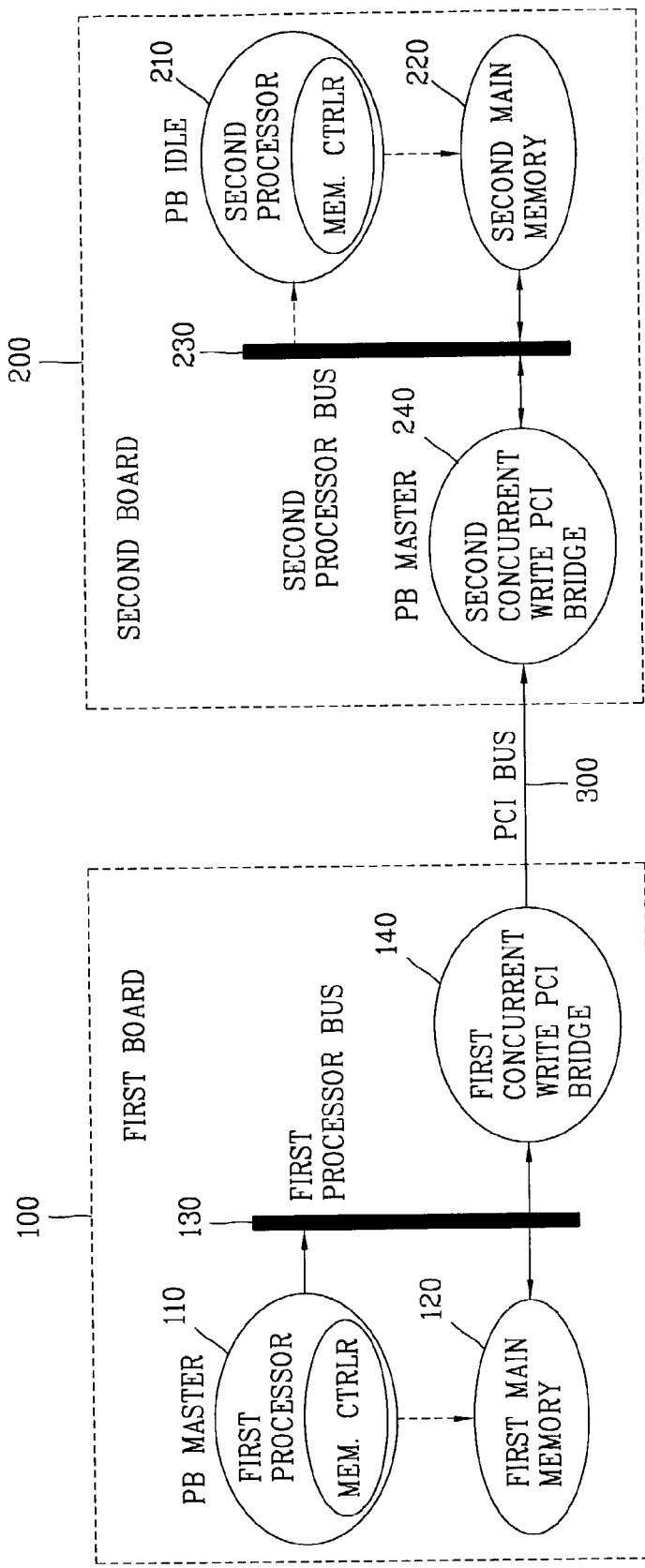
FIG. 4 illustrates a dual apparatus using a concurrent write function in accordance with a preferred embodiment of the present invention.

FIG. 4 illustrates a dual apparatus using a concurrent write function in accordance with a preferred embodiment of the present invention. As depicted in FIG. 4, the dual apparatus using the concurrent write function preferably includes a first board 100, a second board 200, and a PCI bus 300 for connecting the first and second boards 100, 200.

The first board 100 preferably includes a first processor 110 for outputting data and a control signal and a first main memory 120 for storing the data according to the control signal. The first board also preferably includes a dual controller for monitoring the processor bus 130 and performing concurrent write according to the monitoring result.

The dual controller preferably includes a first concurrent write PCI bridge 140 for determining whether to perform concurrent write by snooping the first processor bus 130 and performing the concurrent write with the second board 200 through the PCI bus 300.

The second board 200 preferably includes a second processor 210 and a second main memory 220. Also, a second concurrent write PCI bridge 240 is provided and is coupled to the second processor 210 and second main memory 220 through second processor bus 230.

Figure 5:
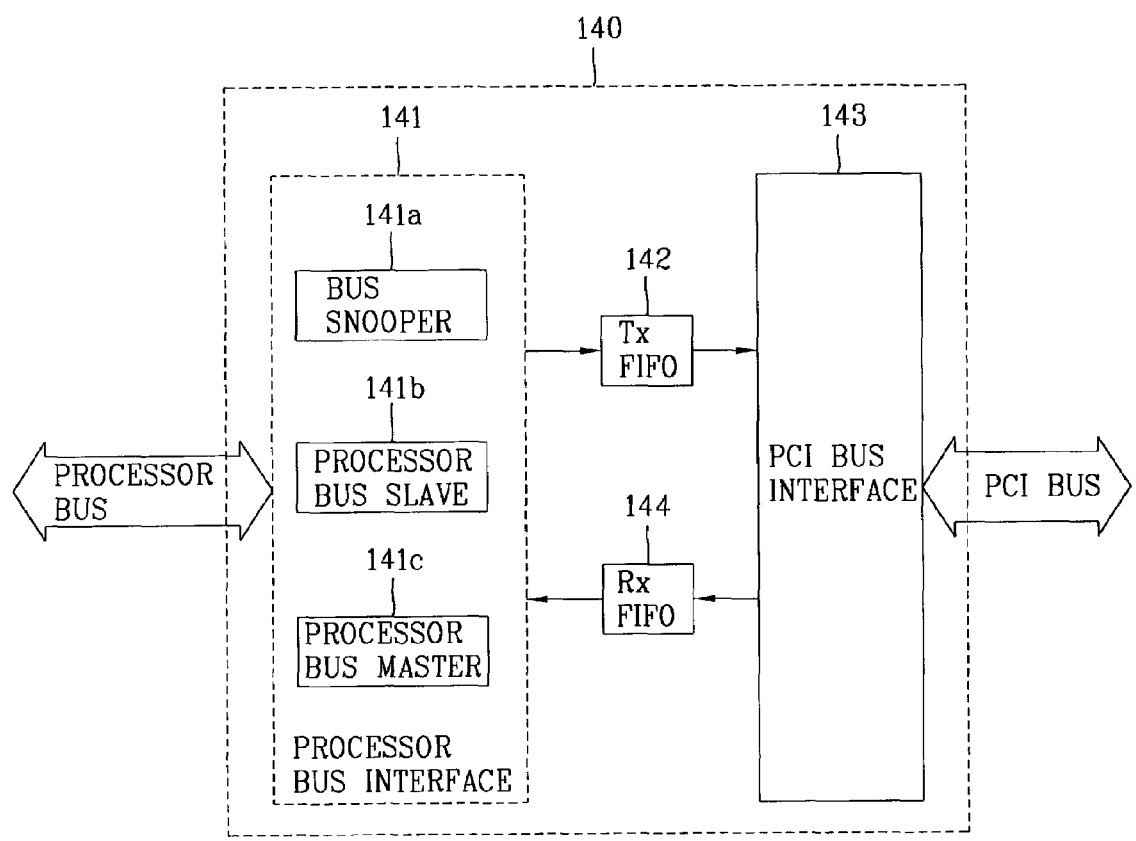
FIG. 5 is a block diagram illustrating a construction of a concurrent write PCI bridge according to a preferred embodiment of the present invention.

FIG. 5 illustrates additional detail of the first concurrent write PCI bridge 140. As depicted in FIG. 5, the first concurrent write PCI bridge 140 preferably includes a processor bus interface 141 for monitoring the first processor bus 130 of the first board 100, determining whether it performs the concurrent write, and interfacing with the first processor bus 130. The first concurrent write PCI bridge also preferably includes a PCI bus interface 143 for interfacing with the PCI bus 300. A transmission buffer 142 (Tx FIFO (first in first out)) is also provided for buffering the data outputted from the processor bus interface 141 and outputting the data to the PCI bus interface 143, and a reception buffer (Rx FIFO) 144 is provided for buffering the data outputted from the PCI bus interface 143 and outputting the data to the processor bus interface 141.

The processor bus interface 141 preferably includes a bus snooper 141a for snooping the first processor bus 130 to determine whether to perform the concurrent write and for transmitting data on the first processor bus 130 to the PCI bus interface 143. The processor bus interface 141 further preferably includes a processor bus slave 141b operated as slave and outputting data on the first processor bus 130 to the transmission buffer 142, and a processor bus master 141c for outputting data outputted from the reception buffer 144 to the processor bus 130.

The processor bus slave 141b is preferably operated as a general processor bus slave and the processor bus master 141c is preferably operated when the first board 100 operates in the standby state.

An operation of the dual apparatus using the concurrent write function according to the preferred embodiment will next be described. It should be understood that content change of the main memory includes, for example, operations such as data write, data delete, data addition, etc. In addition, in the memory, content change in an operating system code region and a stack region is excluded from the data synchronization. In the preferred embodiment, the concurrent write includes a data change operation in data synchronization (when data synchronization is required to the data) as well as a data write operation.

Figure 6:
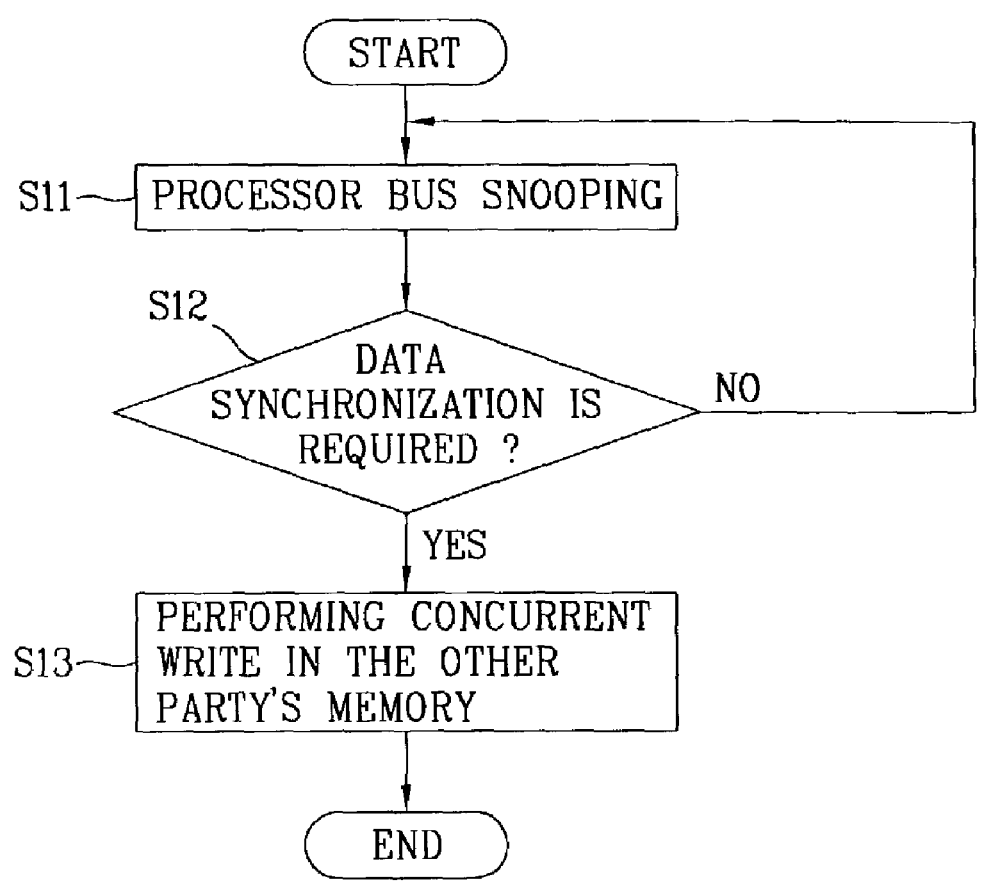
FIG. 6 is a flow chart illustrating a synchronization method using a concurrent write function in accordance with a preferred embodiment of the present invention.

FIG. 6 is a flow chart illustrating a method using a concurrent write function in accordance with the preferred embodiment. For this example, the first board 100 is operated as active and the second board 20 is operated as standby.

When the first processor 110 of the first board 100 changes a content of the first main memory 120, the first concurrent write PCI bridge 140 preferably detects the change without using the first processor 110 and simultaneously changes content of the second main memory 220 of the second board 200. Accordingly, data synchronization between the first main memory 120 and the second main memory 220 is maintained.

Thus, the first processor 110 of the first board 100 is operated as a processor bus master and the first main memory 120 is operated as a processor bus slave. The first concurrent write PCI bridge 140 performs a processor bus snooping and the second concurrent write PCI bridge 240 of the second board 200 is operated as a processor bus master. The second processor 210 is in an idle state.

When there is data to be written in the first main memory 120, the first processor 110 of the first board 100 occupies the first processor bus 130 and carries the data to the first processor bus 130. An address to which the data is to be written is carried together with the data.

The bus snooper 141a of the first concurrent write PCI bridge 140 snoops the first processor bus 130, as shown at step S11. If it is determined that data synchronization is requited based on the data and the address on the first processor bus 130 changing content, it determines that the concurrent write function should be performed, as shown at step S12.

The bus snooper 141a thus transmits the data and the address from the first processor bus 130 to the transmission buffer 142.

When the transmission buffer 142 is not empty, in other words, when there is data to be transmitted, the PCI bus interface 143 of the first concurrent write PCI bridge 140 occupies the PCI bus 300, fetches the data and the address from the transmission buffer 142, and carries them to the occupied PCI bus 300.

Then, the second concurrent write PCI bridge 240 of the second board 200 receives the data and the address on the PCI bus 300 and occupies the second processor bus 230 as the master of the second processor bus 230.

The PCI bus interface of the second concurrent write PCI bridge 240 thus fetches the data and the address from the PCI bus 300 and outputs them to the reception buffer. Then, when the reception buffer is not empty, the processor bus interface of the second concurrent write PCI bridge 240 occupies the second processor bus 230, fetches the data and the address from the reception buffer, and outputs them to the second main memory 220 through the occupied second processor bus 230 as shown at step S13.

In the meantime, the data on the first processor bus 130 is outputted to the first main memory 120 by the first processor 110, and is written in the first main memory 120. Accordingly, the data synchronization between the first main memory 120 and the second main memory 220 is performed.

Because the transmission speed of the first processor bus 130 is faster than the transmission speed of the PCI bus 300, the first concurrent write PCI bridge 140 occupies the first processor bus 130 when the concurrent write PCI bridge 140 transmits data to the second board 200 for data synchronization and the transmission buffer 142 is full. This prevents the first processor 110 from occupying the first processor bus 130, and accordingly the data transmission can be performed safely.

As described above, the dual apparatus and the method thereof using the concurrent write function in accordance with the preferred embodiment has many advantages. For example, by making a PCI bridge perform a bus snooping, data can be transmitted to the second board without affecting the processor. The processor does not participate in data synchronization, and accordingly a performance of the processor can be improved.

In addition, by performing content change of the second memory at the same time as content change of the first memory thereof by snooping a processor bus, the time required for data synchronization between the two memories can be reduced.

Moreover, in a dual apparatus, when a transmission speed of a processor bus is faster than a transmission speed of a PCI bus, if data to be concurrent-written are sequentially generated, it can be buffered in a transmission buffer. In addition, when the transmission buffer is full, because the concurrent write PCI bridge of the active board occupies the processor bus until there is a certain buffering space in the transmission buffer, the active processor cannot occupy the processor bus temporarily, and accordingly data loss problem due to transmission speed difference can be solved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A dual apparatus using a concurrent write function, comprising
a first board having a first main memory and configured to perform a concurrent write in the first main memory and in a second main memory not on the first board according to a bus snooping result; and
a second board coupled to the first board with a PCI bus, and having the second main memory, and configured to perform data synchronization with the first memory according to the concurrent write procedure of the first board, wherein the first and second boards each respectively comprise:
a processor configured to output data and a control signal;
the first main memory or the second main memory each respectively coupled to store the data according to the control signal; and
a dual controller coupled to monitor a processor bus and perform the concurrent write procedure according to the monitoring result, wherein the dual controller comprises a concurrent write PCI bridge configured to determine whether to perform a concurrent write function by snooping the processor bus, and wherein the dual controller of the first board is configured to perform the concurrent write procedure with the second board through the PCI bus, and wherein the concurrent write PCI bridge comprises:
a processor bus interface configured to monitor the processor bus of the board thereof, determine whether to perform the concurrent write function, and interface with the processor bus;
a PCI bus interface configured to interface with another board using the PCI bus;
a transmission buffer configured to buffer data output from the processor bus interface and output the data to the PCI bus interface; and
a reception buffer configured to buffer the data output from the PCI bus interface and output the data to the processor bus interface.

2. The apparatus of claim 1, wherein the processor bus interface comprises:
a bus snooper configured to snoop the processor bus and transmit data to be concurrently-written on the processing bus to the PCI bus interface;
a processor bus slave, operating as slave, and configured to transmit data on the processor bus to the PCI bus interface; and
a processor bus master configured to transmit data outputted from the reception buffer to the processor bus.

3. The apparatus of claim 1, wherein the concurrent write PCI bridge occupies the processor bus until the transmission buffer has a prescribed amount of buffering space after the transmission buffer is full due to difference in a transmission speed of the processor bus and the PCI bus.

4. The apparatus of claim 1, wherein the transmission buffer becomes full when the transmission speed of the processor bus is greater than a transmission speed of the PCI bus.

5. The apparatus of claim 1, wherein the first board is an active board and wherein the second board is a standby board.

6. A method of performing a concurrent write function of a dual system, comprising:
outputting data and a control signal for inputting to a first memory of an active board to a processor bus by an active, processor of the active board;
snooping the processor bus by a concurrent write PCI bridge;
buffering the data and the control signal from the processor bus by the concurrent write PCI bridge when data synchronization between the first memory of the active board and a second memory of a standby board is required;
transmitting the buffered data and the control signal from the concurrent write PCI bridge to a standby board through a PCI bus; and
writing the data and the control signal in the second memory of the standby board by a concurrent write PCI bridge of the standby board; wherein the concurrent write PCI bridge comprises:
a processor bus interface configured to monitor the processor bus of the board thereof, determine whether to perform the concurrent write function and interface with the processor bus;
a PCI bus interface configured to interface with another board using the PCI bus;
a transmission buffet configured to buffet data outputted from the processor bus interface and output the data to the PCI bus interface; and
a reception buffer configured to buffet the data outputted from the PCI bus interface and output the data to the processor bus interface.

7. The method of claim 6, further comprising receiving the data and the control signal from the processor bus and writing the data in the memory of the active board according to the control signal by the active board.

* * * * *